United States Patent
Lee et al.

(10) Patent No.: US 12,454,853 B2
(45) Date of Patent: Oct. 28, 2025

(54) DOOR SYSTEM FOR VEHICLE

(71) Applicants: Hyundai Motor Company, Seoul (KR); Kia Corporation, Seoul (KR)

(72) Inventors: Sang Heon Lee, Seoul (KR); Dong Eun Cha, Hwaseong-Si (KR); Jin Ho Hwang, Cheonan-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/679,123

(22) Filed: May 30, 2024

(65) Prior Publication Data
US 2025/0223855 A1 Jul. 10, 2025

(30) Foreign Application Priority Data
Jan. 4, 2024 (KR) .................. 10-2024-0001360

(51) Int. Cl.
| | |
|---|---|
| *E05D 15/06* | (2006.01) |
| *B60J 5/06* | (2006.01) |
| *E05D 15/10* | (2006.01) |
| *E05D 15/48* | (2006.01) |

(52) U.S. Cl.
CPC ............ *E05D 15/0604* (2013.01); *B60J 5/06* (2013.01); *E05D 15/1021* (2013.01); *E05D 2015/0695* (2013.01); *E05D 2015/485* (2013.01); *E05Y 2900/50* (2013.01)

(58) Field of Classification Search
CPC ............ E05D 15/0604; E05D 15/101; E05D 15/1021; E05D 15/1022; E05D 2015/485; E05D 2015/0695
See application file for complete search history.

(56) References Cited

U.S. PATENT DOCUMENTS

| | | | |
|---|---|---|---|
| 8,205,387 B2 * | 6/2012 | Ranaudo ............... | E06B 3/4636 |
| | | | 49/141 |
| 9,194,172 B2 * | 11/2015 | Rees ...................... | E05D 15/58 |
| 9,718,331 B2 * | 8/2017 | Maruyama ............. | E05B 83/40 |
| 10,017,975 B2 * | 7/2018 | Broadhead ............ | E05F 15/70 |
| 11,446,989 B1 * | 9/2022 | Brown ................ | E05D 15/1005 |
| 2018/0238099 A1 * | 8/2018 | Schatz ................... | E05F 15/40 |

* cited by examiner

*Primary Examiner* — Marcus Menezes
(74) *Attorney, Agent, or Firm* — Morgan Lewis & Bockius LLP

(57) ABSTRACT

A door system for a vehicle is disclosed, which enables a vehicle door to operate selectively in both sliding and swinging modes. The system includes a hinge mechanism and an electromagnetic locking unit that controls the transition between the two movement types. This dual-mode functionality improves accessibility, space efficiency, and emergency egress capabilities.

18 Claims, 8 Drawing Sheets

DOOR SYSTEM FOR VEHICLE

CROSS-REFERENCE TO RELATED APPLICATION

The present application claims priority to Korean Patent Application No. 10-2024-0001360, filed Jan. 4, 2024, the entire contents of which is incorporated herein for all purposes by this reference.

BACKGROUND OF THE PRESENT DISCLOSURE

Field of the Present Disclosure

The present disclosure relates to a vehicle door system, and specifically to the vehicle door system which may be opened by sliding and swinging movement methods.

Description of Related Art

Vehicle doors fundamentally allow access into and protect an interior of the vehicle from an outside thereof. The vehicle doors may be opened through sliding and swinging movements. However, a door is typically opened in one of these methods.

However, due to a need for flexibility in changing door opening method depending on a location of surrounding obstacles, an advancement of autonomous driving technology, and an emergence of Purpose Built Vehicles (PBVs) due to a development of electric vehicle technology, there has been a demand for vehicle door systems that can accommodate both sliding and swinging methods.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle door system configured for both sliding and swinging movement methods. Various aspects of the present disclosure are directed to providing the vehicle door system configured for both sliding and swinging methods.

According to one aspect of the present disclosure, the vehicle door system includes: a vehicle body coupled with a floor panel of the vehicle, including an opening portion formed on a side of the vehicle body where a door is coupled; a door panel coupled with the opening portion to form the vehicle door; a first fixing portion provided on the vehicle body so that one point of the door panel may be fixed to the vehicle body and making a swinging movement of the door panel possible; a second fixing portion provided on the vehicle body so that one point of the door panel may be fixed to the vehicle body and making a sliding movement of the door panel possible; and a controller making a fixation between either the first fixing portion or the second fixing portion and the door panel released when a door is opened, making the swinging movement of the door panel possible when the fixation between second fixing portion and the door panel is released, and making the sliding movement of the door panel possible when the fixation between the first fixing portion and the door panel is released.

The first fixing portion may include: a hinge axis fixed to the vehicle body; and a hinge arm which is rotatably coupled to the hinge axis, allowing for swinging movement around the hinge axis and electromagnetically securing the door panel.

One end portion of the hinge arm is coupled with the hinge axis, and an electromagnet is provided on other end portion of the hinge axis, so that the door panel may be fixed and release.

The second fixing portion may include a sliding rail mounted on the vehicle body, and a door panel fixing arm, allowing for sliding movement on the sliding rail and electromagnetically securing the door panel.

One end portion of the door panel fixing arm may be coupled with the sliding rail and other end portion of the door panel fixing arm is provided with the electromagnet, so that the door panel may be fixed and released.

The sliding rail may be curved, so that the door panel may slide to an outside of the vehicle when the door is opened by a sliding movement of the door panel.

The controller is configured to move the door panel and the door panel may be provided with sensors to detect any surrounding obstacle located in a path of movement of the door panel.

The sensor may include: a first sensor detecting any surrounding obstacle located in the path of movement when the door panel swings; and a second sensor detecting any surrounding obstacle located in the path of movement when the door panel slides.

When any surrounding obstacle is detected while the door panel moves, the door panel stops moving and the controller may be configured to determine whether to change to a different movement method of the door panel.

The controller may be configured to determine a movement method of the door panel according to a result of detecting any surrounding obstacle.

The controller is configured to determine an extent of door opening based on a range of swinging or sliding movement possible for the door panel, and may confirm an occupant's preference as to whether to move the door panel according to a movement method that allows for greater door opening.

When the occupant does not agree to the different movement method, the controller is configured to confirm the occupant's preference for a different movement method, and when the occupant agrees to the different movement method, the door panel may be moved in the different movement method, and when the occupant does not agree to the different movement method, the vehicle may be moved to a different location.

When any obstacle is detected while the door panel is moved, the door panel stops moving and the controller may be configured to determine whether to change to a different movement method of the door panel.

If it is possible to change to a different movement method, the movement method will be accordingly changed. If not, the vehicle will be moved to a different location.

The controller may move the door panel according to a movement method of the door panel selected by the occupant.

The controller may confirm whether or not there is any obstacle in the path of movement of the door panel according to the movement method of the door panel selected by the occupant.

When there is any obstacle in the path of movement of the door panel, the controller may be configured to determine whether to change to a different movement method of the door panel.

When it is not possible to change to a different movement method, or the occupant does not agree to change to the different movement method, the vehicle may be moved to a different location.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
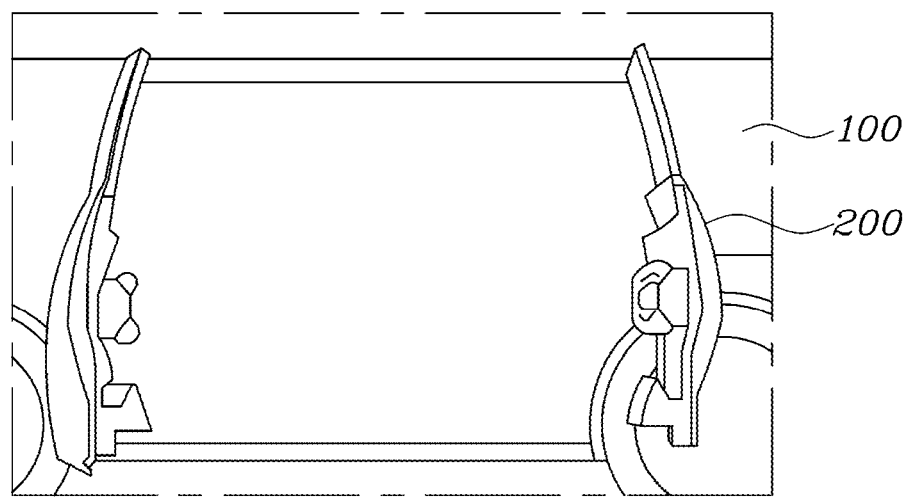
FIGS. 1 and 2 are schematic diagrams simply showing a vehicle applied to vehicle doors system according to exemplary embodiments of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments included in the present specification will be described in detail with reference to the accompanying drawings. However, regardless of a drawing symbol, identical or similar components will be provided the same reference number and regarding this, redundant explanations will be omitted.

In describing embodiments included in the present specification, if it is determined that detailed descriptions of related known technologies may obscure a gist of embodiments included in the present specification, the detailed descriptions will be omitted.

Furthermore, the accompanying drawings are only intended to facilitate an understanding of embodiments included in the present specification. The technical ideas included in the present specification are also not limited by the accompanying drawings and it should also be understood to include all changes, equivalents, and substitutes included in the spirit and technical scope of the present disclosure.

A term including an ordinal number, such as first, second, etc., may be used to describe various components. However. The above components are not limited by the above terms. The above terms are used only for distinguishing one component from another.

Unless a singular expression is clearly expressed differently in context, Singular expressions include plural expressions.

In the present specification, a term such as "comprise" or "include" is intended to specify the presence of features, numbers, steps, operations, components, parts, or combinations thereof described in the present specification, therefore it should be understood that this does not exclude in advance a possibility of the existence or addition of one feature, other features, numbers, steps, operations, components, parts, or combinations thereof.

When one component is referred to as being "connected" or "coupled" with or to another, it should be understood that it may be directly connected or jointed to another component, however it should be understood that other components may exist in between. In contrast, only when one component is referred to as being "directly connected" or "directly jointed" to another, it should be understood that there aren't other components in between.

A controller may include a memory that stores other controllers, a communication device communicating with sensors, an operating system, a logic instruction, and an input and output information for controlling functions in charge. The controller also may include one or more processors performing judgments, calculations, decisions and so forth necessary to control the functions in charge.

Figure 2:
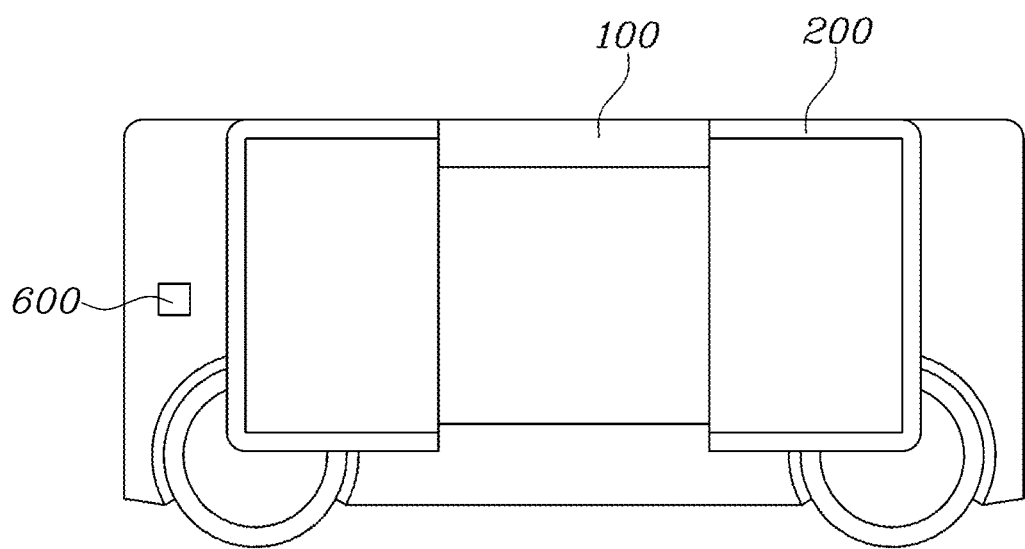

FIGS. 1 and 2 are schematic diagrams simply showing a vehicle applied to a vehicle door system according to exemplary embodiments of the present disclosure.

FIG. 1 shows vehicle doors opened in a swinging method, and FIG. 2 shows the vehicle doors opened in a sliding method.

Figure 3:
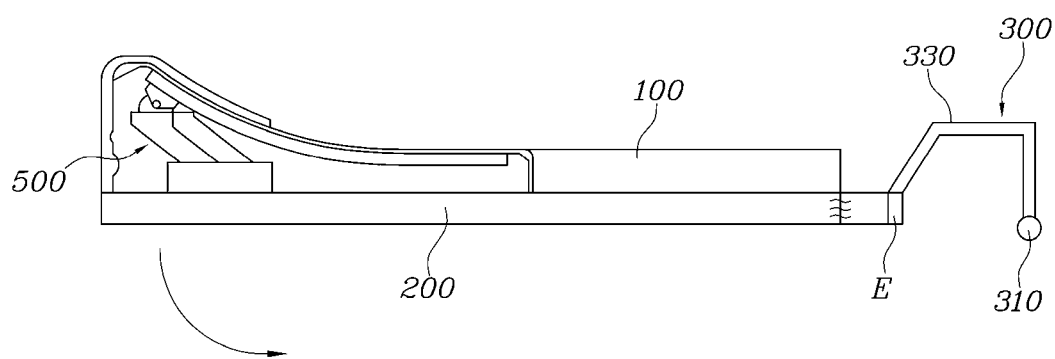
FIG. 3 and FIG. 4 are schematic diagrams showing an operating scene when the vehicle doors applied to the vehicle door system are opened in a swinging method according to exemplary embodiments of the present disclosure.
Figure 4:
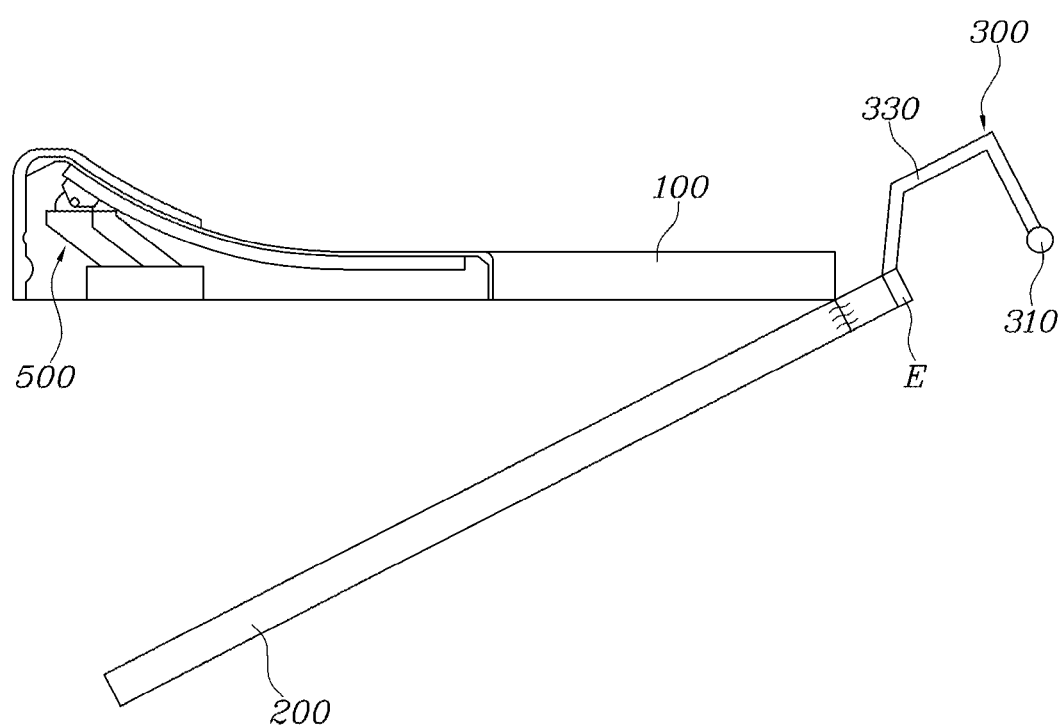
Figure 5:
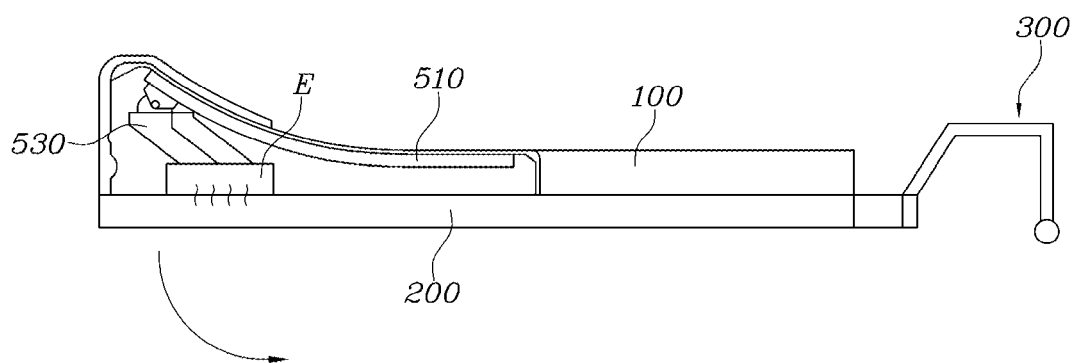
FIG. 5 and FIG. 6 are schematic diagrams showing the operating scene when the vehicle doors applied to the vehicle door system are opened in the sliding method according to exemplary embodiments of the present disclosure.
Figure 6:
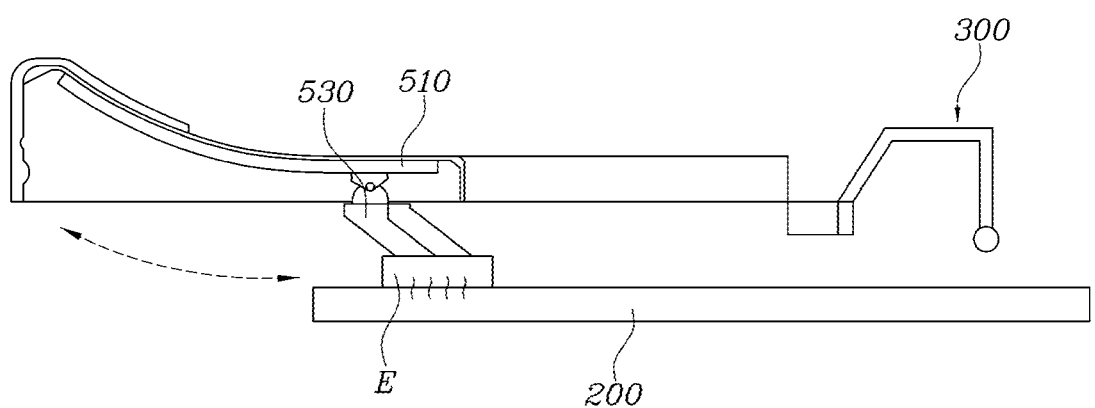

Moreover, FIG. 3 and FIG. 4 are schematic diagrams showing an operating scene when each of the vehicle doors applied to the vehicle door system is opened in the swinging method according to exemplary embodiments of the present disclosure, and FIG. 5 and FIG. 6 are schematic diagrams showing an operating scene when each of the vehicle doors applied to the vehicle door system is opened in the sliding method according to exemplary embodiments of the present disclosure.

Hereinafter, referring to FIGS. 1, 2, 3, 4, 5 and 6, the vehicle door system according to exemplary embodiments of the present disclosure will be described.

According to an exemplary embodiment of the present disclosure, a door system for vehicles includes: a vehicle body 100 which is coupled to a floor panel of a vehicle, including an opening portion formed on a side thereof where a door is coupled; a door panel 200 that forms the door of the vehicle, coupled to the opening portion; a first fixing portion 300 provided on the vehicle body 100, enabling swinging movement of the door panel 200, wherein one point of the door panel 200 may be fixed to the vehicle body 100; a second fixing portion 500 provided on the vehicle body 100, enabling sliding movement of the door panel 200, wherein one point of the door panel 200 may be fixed to the vehicle body 100; and A controller 600 that, upon opening the door, releases the fixation between either the first fixing portion 300 or the second fixing portion 500 and the door panel 200, where if the fixation between the second fixing portion 500 and the door panel 200 is released, the swinging movement of the door panel 200 is possible, and if the fixation between the first fixing portion 300 and the door panel 200 is released, the sliding movement of the door panel 100 is possible.

The opening portion where the door panel 200 may be mounted at a side of the vehicle body 100 is formed and may support and secure the door panel 200. The opening portion is also formed on the side of the vehicle body 100 in a longitudinal direction of the vehicle.

The door panel 200 may be coupled with the vehicle body 100 through the first fixing portion 300 or the second fixing portion 500. The first fixing portion 300 and the second fixing portion 500 may secure the door panel 200 at the vehicle body 100. Furthermore, when the vehicle door is opened, if the fixation between either the first fixing portion 300 or the second fixing portion 500 and the door panel 200 is released, the swinging movement or the sliding movement of the door panel 200 is possible.

In case that the vehicle door is closed, namely, during running or parking time of the vehicle, both the first fixing portion 300 and the second fixing portion 500 are coupled with the door panel 200, so that the door panel 200 will not be opened.

Afterwards, in case that the vehicle doors are opened, when the fixation between the second fixing portion 500 and the door panel 200 is released, the fixation between the first fixing portion 300 and the door panel 200 is maintained, so that the swinging movement of the door panel 200 is possible.

On the other hand, in case that the fixation between the first fixing portion 300 and the door panel 200 is released, the fixation between the second fixing portion 500 and the door panel 200 is maintained, so that the sliding movement of the door panel 200 is possible.

In other words, when both the first fixing portion 300 and the second fixing portion 500 fix the door panel 200, a movement of the door panel 200 is not possible. When the fixation between either the first fixing portion 300 or the second fixing portion 500 and the door panel 200 is released, the movement of the door panel 200 is possible.

As will be described later, the fixation between either the first fixing portion 300 or the second fixing portion 500 and the door panel 200 is executed by the controller 600. Additionally, a movement of the door panel 200 may be controlled by the controller 600, or the movement of the door panel 200 may be controlled by an occupant.

In other words, when the door panel 200 is additionally connected to an drive motor, the controller 600 may be configured for controlling an opening of the door panel 200 by controlling the drive motor, even if the drive motor isn't additionally connected to the door panel 200, the door panel 200 may be opened by being pulled or pushed aside by the occupant.

Additionally, the controller 600 guides an opening method of the door panel 200 through a speaker device provided inside or outside the vehicle or an infotainment system provided inside the vehicle, and may confirm the occupant's preference. The occupant may predict a time that the door panel 200 will be opened by a voice transmitted through the speaker device. Alternatively, the occupant may predict that the fixation between either the first fixing portion 300 or the second fixing portion 500 and the door panel 200 will be released by the voice transmitted through the speaker device.

Meanwhile, the first fixing portion 300 may include a hinge axis 310 provided in the vehicle body; and a hinge arm 330 which is coupled to the hinge axis, allowing for swinging movement around the hinge axis 330 and electromagnetically securing the door panel 200.

In other words, if the door panel 200 remains secured to the hinge arm 330, the swinging movement of the door panel 200 is possible around the hinge axis 310 connected to the hinge arm 330. One end portion of the hinge arm 330 is coupled with the hinge axis 310, and an electromagnet E is provided on the other end portion of the hinge axis 310, so that the door panel 200 may be electromagnetically secured.

The controller 600 operatively connected to the electromagnet E may supply current to the electromagnet E to electromagnetically secure the door panel 200. The electromagnet E may include one or more of a coil or a permanent magnet. Therefore, the controller may electromagnetically secure the door panel 200 either by supplying current to the coil, thus fixing it in place, or by altering a pole orientation of the permanent magnet through the supply of current to the coil.

Meanwhile, the second fixing portion 500 may include a sliding rail 510 provided on the vehicle body, and a door panel fixing arm 530, allowing for sliding movement of the door on the sliding rail 510 and electromagnetically securing the door panel 200.

In other words, when the door panel 200 is secured to the door panel fixing arm 530, it may be possible for the door panel 200 to slide along the sliding rail 510 connected to the door panel fixing arm 530. One end portion of the door panel fixing arm 530 is coupled with the sliding rail 510, and an electromagnet E is provided at the other end portion of the sliding rail 510, enabling the door panel 200 to be electromagnetically secured.

The controller 600 operatively connected to the electromagnet E at the other end portion of the sliding rail 510 may supply current to the electromagnet E to electromagnetically secure the door panel 200. The electromagnet E may include one or more of a coil or a permanent magnet. Therefore, the controller 600 may electromagnetically secure the door panel 200 either by supplying current to the coil, thus fixing it in place, or by altering the pole orientation of the permanent magnet through the supply of current to the coil.

Meanwhile, the sliding rail 510 is formed to be curved, so that when the doors are opened by the sliding movement of the door panel 200, the door panel 200 may slide outwardly from the vehicle. In other words, when the doors are opened by a sliding movement method, the vehicle door moves slightly forward due to a shape of the sliding rail and then shows a sideways sliding motion.

In the present way, by varying the movement of the door panel 200 through the release of its fixation with either the first fixation portion 300 or the second fixation portion 500, it is possible to open the door either by swinging or sliding. The choice between swinging or sliding to open the door may be made based on the space where the vehicle is parked, increasing convenience for getting on or off the vehicle.

In other words, one can freely choose between the sliding and swinging methods for entry and exit convenience, and select the door opening method which is most suitable for specific situations.

Meanwhile, the drive motor connected to the door panel 200 may be provided inside the vehicle body 100, and the controller 600 may move the door panel 200 through controlling the drive motor. In other words, the occupant enables the controller 600 to move the door panel 200 through a setting of the vehicle.

Sensors may be provided at the door panel 200 to prevent the door panel 200 from colliding with any obstacle or any person by an automatic movement of the door panel 200. The sensors may detect any surrounding obstacle located in the path of movement of the door panel 200 according to an door opening. It is also possible to instantly detect any obstacle or any person entering the movement path of the door panel 200.

The sensors include: a first sensor 710 for detecting any surrounding obstacle located in the movement path when the door panel 200 swings; and a second sensor 720 for detecting any surrounding obstacle located in the movement path when the door panel 200 slides.

The first sensor 710 detects any surrounding obstacles in the path during the swinging movement of the door panel 200. Therefore, it is desirable for the first sensor 710 to be located at one end portion of the door panel 200, a certain distance away from the center portion of the swinging of the door panel 200.

Furthermore, the second sensor 720 detects any surrounding obstacles in the path during the sliding movement of the door panel 200. Thus, it is desirable for the second sensor 720 to be located at one end portion of the door panel 200, a certain distance away from the point where the sliding of the door panel 200 begins.

Figure 7:
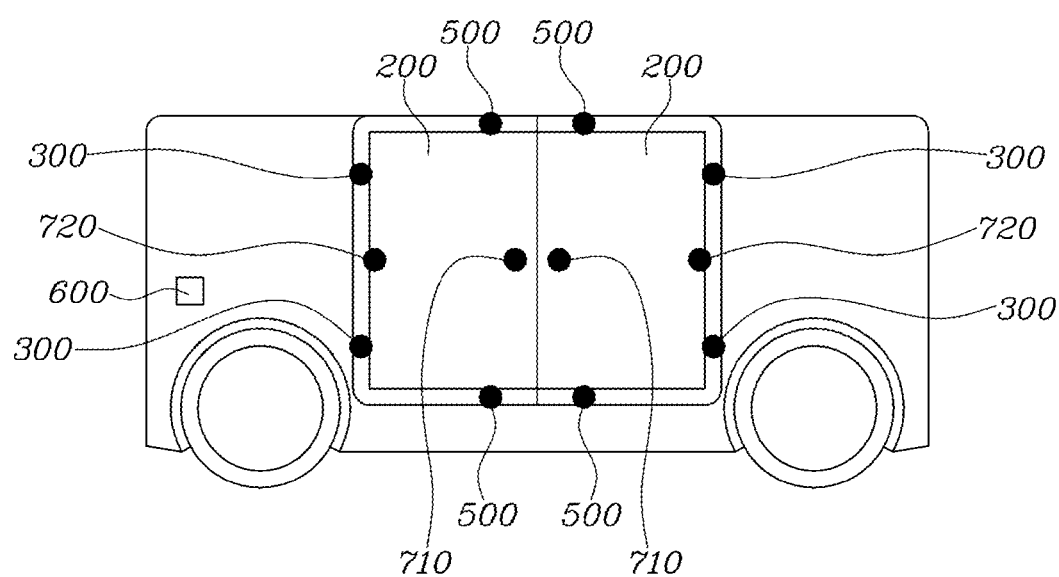
FIG. 7 is a schematic diagram showing the vehicle to which the vehicle door system of the present disclosure is applied.

FIG. 7 is a diagram showing the vehicle to which the vehicle door system of the present disclosure is applied. Referring to FIG. 7, a plurality of doors may be provided with the vehicle. Therefore, a plurality of door panels 200 may be coupled with the vehicle body, and each of the door panels 200 may be secured to the vehicle body 100 by the first fixing portion 300 and the second fixing portion 500 respectively.

A plurality of first fixing portions 300 and the second fixing portions 500 may be provided with the vehicle body 100, and both two of the first fixing portions 300 and two of the second fixing portions 500 may secure the door panel 200 per door. Each position of the first fixing portion 300 and the second fixing portion 500 may be changed according to a door opening direction thereof.

Referring to FIG. 2, the door vehicle includes a plurality of doors, and when the vehicle doors are opened by sliding, each of the doors located at the same side is opened in an opposite direction by sliding, so that a sufficient space for the occupant's getting on or off the vehicle is ensured.

In a situation like this, it is desirable that each of the door panel 200 located at the same side should swing in an opposite direction and open as shown in FIG. 1.

To configure the direction in which the doors are opened as described above, it is desirable for the first fixing portion 300 to be provided at a point on the vehicle body 100 vertical to a ground, and for the second fixing portion 500 to be provided at a point on the vehicle body 100 horizontal to the ground.

Meanwhile, it is desirable that each of positions of the first sensor 710 and the second sensor 720 should also be located at both end portions of the door panel 200 so that the first sensor 710 and the second sensor 720 may also detect any obstacle existing in or entering the movement path of the door panel 200 as rapidly as possible. Each of the positions of the first sensor 710 and the second sensor 720 may also be determined by considering a swinging radius and the movement path of the door panel 200.

Figure 8:
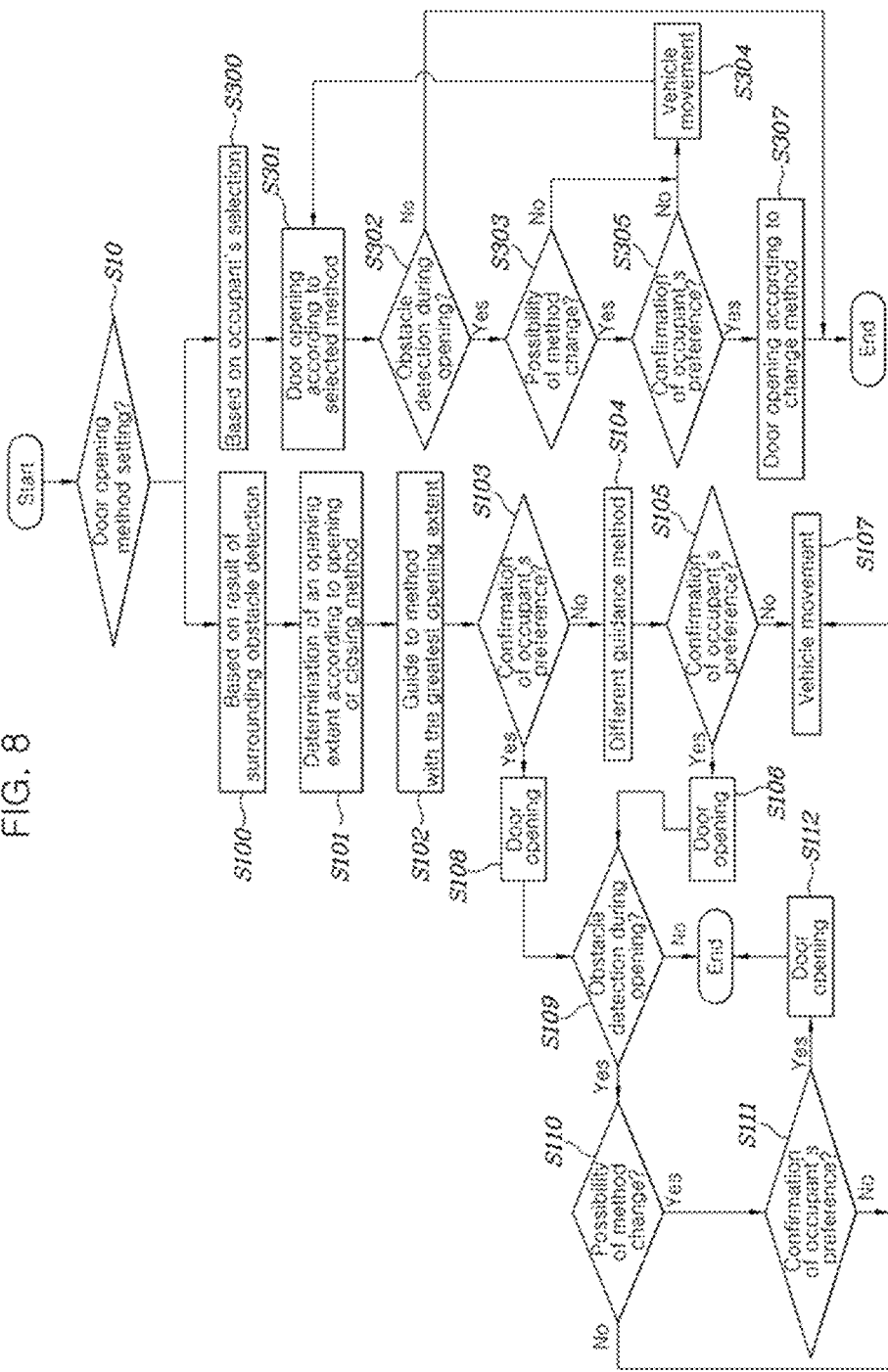
FIG. 8 is a diagram showing a flow chart of how the vehicle door system of the present disclosure operates.

FIG. 8 is a diagram showing a flow chart of how the vehicle door system of the present disclosure operates. Referring to FIG. 8, an operation of the vehicle door system will be described. An occupant may set the door opening method (S10). The occupant may directly select (S100) the door opening method or the door opening method may be selected by the controller 600.

When the occupant makes the door opening method selected (S100) by the controller 600, the controller 600 may select the door opening method according to detecting any obstacle around the vehicle.

The controller 600 may be configured to determine (S101) a door opening extent, when the doors are opened by the swinging method and when opened by the door opening extent through the first sensor 710 and the second sensor 720. The door opening method may also be selected according to a method with the largest door opening extent. In other words, the method with the largest door opening extent may be selected by prioritizing the convenience of the occupant's getting on or off the vehicle.

At the present time, the controller 600 guides (S102) the occupant about the selected method through the speaker device or the infotainment system and confirms (S103) the occupant's preference. When the occupant agrees, the controller may open (S108) the doors according to the guided method. However, when the occupant does not agree with the method selected by the controller 600, the controller 600 guides (S104) the occupant to a different method and confirms (S105) a different preference of the occupant's again.

When the occupant agrees, the doors open (S106) according to the changed method, and when the occupant does not agree to the different movement method, the vehicle is moved (S107) to a different location and the controller 600 may select the door opening method again according to a result of detecting any surrounding obstacle.

Meanwhile, any obstacle may be detected (S109) by the sensors during the movement time of the door panel 200. When any surrounding obstacle is detected by the first sensor 710 or the second sensor 720, the movement of the door panel 200 stops, the controller 600 may be configured to determine (S110) whether it is possible to change to a different movement method of the door panel.

If the movement method of the door panel 200 is determined to be the swing method, the fixation between the second fixation portion 500 and the door panel 200 is released, while the fixation with the first fixation portion 300 is maintained. In the instant case, the door panel 200 includes a swinging radius around the hinge axis 310 and can move along the present radius.

When any obstacle in the movement path is detected by the first sensor 710 during the movement time of the door panel 200 under a control of the controller 600, the controller 600 makes the movement of the door panel 200 stopped, so that a collision between the obstacle and the door panel 200 may be prevented.

At the present time, the controller 600 may be configured to determine whether it is possible to change to a different movement method of the door panel. In other words, the controller 600 is configured to determine (S110) whether the doors may be opened in the sliding method. The controller 600 can determine whether or not it is possible to open the door in the swing mode by use of the second sensor 720 to detect the presence of any surrounding obstacles during the sliding movement of the door panel 200, and to determine the extent to which the door opening is limited by these obstacles when opened in the sliding method.

At the present time, the controller 600 may confirm (S111) an occupant's preference as to whether or not to move the door panel according to a method to change. In other words, the controller 600 may confirm the occupant's preference through the speaker device or the infotainment system as to whether or not to open the doors according to the sliding method to change.

In the situation described above, when the occupant agrees to a different movement method, the door panel is moved (S112) in the different movement method, and when the occupant does not agree to the different movement method, the vehicle may be moved (S107) to a different location or wait until the obstacle is removed.

On the other hand, if the movement method of the door panel 200 is determined to be the sliding method, the fixation between the first fixation portion 300 and the door panel 200 is released, while the fixation with the second fixation portion 500 is maintained. In the instant case, the door panel 200 follows a movement path along the sliding rail 510.

When any obstacle in a movement path is detected by the second sensor 720 while the door panel 200 is moved under a control of the controller 600, the controller 600 makes the movement of the door panel 200 stopped, so that a collision between the obstacle and the door panel 200 may be prevented.

At the present time, the controller 600 may determine (S110) whether or not it is possible to change to a different movement method of the door panel. In other words, the controller 600 is configured to determine whether or not the doors may be opened in the swinging method. The controller 600 can determine whether or not it is possible to open the door in the swing mode by use of the first sensor 710 to detect the presence of any surrounding obstacles during the swinging movement of the door panel, and to determine the extent to which the door opening is limited by these obstacles when opened in the swing mode.

At the present time, the controller may confirm (S111) an occupant' preference as to whether to move the door panel according to a door opening method to change. In other words, the controller may confirm the occupant' preference through the speaker device or the infotainment system as to whether or not to open the door according to the swinging method to change.

In the situation described above, when the occupant agrees to a different movement method, the door panel 200 is moved (S112) in the different movement method, and when the occupant does not agree to the movement method, the vehicle may be moved (S107) to a different location or wait until the obstacle is removed.

On the other hand, the occupant may select (S300) a movement method of the door panel. Accordingly, the controller 600 may move (S301) the door panel 200 according to the movement method of the door panel 200 selected by the occupant.

The controller 600 may confirm a presence or absence of the obstacle in the movement path of the door panel 200 according to the movement method of the door panel 200 selected by the occupant. In other words, when the occupant selects a door opening in the swinging method, the presence or absence of the obstacle within the swinging radius of the door panel 200 may be confirmed through the first sensor 710, and when the occupant selects a door opening by the sliding method, the presence or absence of the obstacle in the path of sliding movement of the door panel 200 may be confirmed (S302) through the second sensor 720.

Furthermore, when there is any obstacle in the movement path of the door panel 200 during the door opening according to a method selected by the occupant, the controller 600 may be configured to determine (S303) whether or not it is possible to change to a different movement method of the door panel.

As described above as to whether or not it is possible to change to a different movement method, when the door panels are slid through the second sensor 720, the controller 600 can determine whether or not it is possible to open the door in the swing mode by use of the second sensor 720 to detect the presence of any surrounding obstacles during the sliding movement of the door panel, and to determine the extent to which the door opening is limited by these obstacles when opened in the sliding mode.

The controller 600 can determine whether or not it is possible to open the door in the swing mode by use of the first sensor 710 to detect the presence of any surrounding obstacles during the swinging movement of the door panel, and to determine the extent to which the door opening is limited by these obstacles when opened in the swing mode.

When it is not possible to change to a different movement, the controller 600 may move (S304) the vehicle to a different location or wait until the obstacle is removed.

On the other hand, when it is determined that a door opening method may be changed, the controller may provide an information related to a door opening method to change and confirm (S305) the occupant's preference.

When the occupant agrees, the doors are opened (S307) according to the door opening method to change, and when the occupant does not agree to the different movement method, the controller 600 may move (S304) the vehicle to a different location or wait until the obstacle is removed.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A door system for vehicles, the door system comprising:
    a vehicle body which is coupled to a floor panel of a vehicle, including an opening portion formed on a side of the vehicle body where a door is coupled;
    a door panel that forms the door of the vehicle and is coupled to the opening portion;
    a first fixing portion rotatably mounted on the vehicle body, enabling rotation of the door panel, wherein a first end portion of the door panel is selectively fixed to the first fixing portion by electromagnetic force;
    a second fixing portion mounted on the vehicle body, enabling sliding movement of the door panel, wherein a second end portion of the door panel is selectively fixed to the second fixing portion by electromagnetic force; and
    a controller that is, upon opening the door, configured to release the fixation of either the first fixing portion or the second fixing portion to the door panel by cutting off current to either the first fixing portion or the second fixing portion,
    wherein in response that the fixation of the second fixing portion and the door panel is released, the rotation of the door panel is possible, and in response that the fixation of the first fixing portion and the door panel is released, the sliding movement of the door panel is possible.

2. The door system of claim 1, wherein the first fixing portion includes:
    a hinge axis fixed to the vehicle body; and a hinge arm which is rotatably coupled to the hinge axis, allowing for rotation of the hinge arm around the hinge axis and electromagnetically securing the first end portion of the door panel to the hinge arm selectively.

3. The door system of claim 2, wherein a first end portion of the hinge arm is coupled with the hinge axis, and an electromagnet operatively connected to the controller is provided at a second end portion of the hinge arm, to selectively secure the door panel to the hinge arm.

4. The door system of claim 1, wherein the second fixing portion includes:
   a sliding rail mounted on the vehicle body; and
   a door panel fixing arm slidably mounted on the sliding rail, allowing for the sliding movement of the door on the sliding rail and electromagnetically securing the door panel to the door panel fixing arm selectively.

5. The door system of claim 4, wherein a first end portion of the door panel fixing arm is slidably coupled with the sliding rail, and an electromagnet operatively connected to the controller is mounted at a second end portion of the door panel fixing arm, to selectively secure the door panel to the door panel fixing arm.

6. The door system of claim 4, wherein the sliding rail is formed to be curved, so that in response that the door is opened by the sliding movement of the door panel, the door panel slides along the sliding rail outwardly from the vehicle.

7. The door system of claim 1, wherein the controller is further configured to move the door panel, and wherein the door panel is provided with sensors to detect a surrounding obstacle located in a path of movement of the door panel.

8. The door system of claim 7, wherein the sensors include a first sensor to detect a surrounding obstacle located in a path during the rotation of the door panel, and a second sensor to detect a surrounding obstacle located in a path during the sliding movement of the door panel.

9. The door system of claim 7, wherein in response that the surrounding obstacle is detected during the movement of the door panel, the movement of the door panel is stopped by the controller, and the controller is further configured to determine a possibility of changing to a different movement method of the door panel.

10. The door system of claim 7, wherein the controller is further configured to determine a movement method of the door panel according to a detection result of the surrounding obstacle.

11. The door system of claim 10, wherein the controller is further configured to determine an extent of the movement method based on a range of rotational or sliding movement possible for the door panel, and to confirm an occupant's preference for moving the door panel according to the movement method that allows for greater opening of the opening portion.

12. The door system of claim 11, wherein in response that the occupant does not agree to the movement method, the controller is further configured to confirm a preference of the occupant's for a different movement method, and in response that the occupant agrees to the different movement method, the controller is further configured to make the door panel move in the different movement method, and in response that the occupant does not agree to the different movement method, the vehicle is moved to a different location.

13. The door system of claim 10, wherein the obstacle is detected during the movement of the door panel, the movement of the door panel is stopped, and the controller is further configured to determine a possibility of changing to a different movement method of the door panel.

14. The door system of claim 13, wherein upon concluding that the change to the different movement method is possible, the controller is further configured to change the movement method, and upon concluding that the change to the different movement method is not possible, the controller is further configured to move the vehicle to a different location.

15. The door system of claim 7, wherein the controller is further configured to move the door panel according to a movement method of the door panel selected by an occupant.

16. The door system of claim 15, wherein the controller is further configured to confirm whether the obstacle is positioned in the path of the movement of the door panel according to the movement method of the door panel selected by the occupant.

17. The door system of claim 16, wherein upon concluding that the obstacle is positioned in the movement path of the door panel, the controller is further configured to determine the possibility of changing to a different movement method of the door panel.

18. The door system of claim 17, wherein upon concluding that the change to the different movement method is not possible, or that the occupant does not agree to the change to the different movement method, the controller is further configured to move the vehicle to a different location.

* * * * *